United States Patent
Luttmer

(10) Patent No.: US 8,824,011 B2
(45) Date of Patent: Sep. 2, 2014

(54) METHOD FOR PROCESSING RASTERIZED IMAGE DATA

(71) Applicant: Oce Technologies B.V., Venlo (NL)

(72) Inventor: Maurice L.M. Luttmer, Velden (NL)

(73) Assignee: Oce-Technologies B.V., Venlo (NL)

( * ) Notice: Subject to any disclaimer, the term of this patent is extended or adjusted under 35 U.S.C. 154(b) by 32 days.

(21) Appl. No.: 13/782,479

(22) Filed: Mar. 1, 2013

(65) Prior Publication Data

US 2013/0321828 A1 Dec. 5, 2013

(30) Foreign Application Priority Data

Jun. 1, 2012 (EP) .................................... 12170388

(51) Int. Cl.
| | |
|---|---|
| *G06K 15/02* | (2006.01) |
| *G06K 9/00* | (2006.01) |
| *G06K 9/36* | (2006.01) |
| *G06K 9/40* | (2006.01) |
| *H04N 1/64* | (2006.01) |
| *H04N 1/58* | (2006.01) |

(52) U.S. Cl.
CPC .............. *G06K 15/1878* (2013.01); *H04N 1/64* (2013.01); *H04N 1/58* (2013.01)
USPC ............. 358/1.9; 382/166; 382/232; 382/266

(58) Field of Classification Search
USPC ........ 358/1.9; 382/166, 232, 266; 375/240.16
See application file for complete search history.

(56) References Cited

U.S. PATENT DOCUMENTS

| | | | |
|---|---|---|---|
| 5,585,944 A | 12/1996 | Rodriguez | |
| 5,668,932 A | 9/1997 | Laney | |
| 6,373,583 B1 | 4/2002 | Wood et al. | |
| 8,200,028 B2 * | 6/2012 | Gabso et al. | 382/232 |
| 2007/0211937 A1 * | 9/2007 | Neumann | 382/166 |
| 2007/0230808 A1 | 10/2007 | Kimura | |
| 2011/0280309 A1 * | 11/2011 | Francois et al. | 375/240.16 |

* cited by examiner

*Primary Examiner* — Charlotte M Baker
(74) *Attorney, Agent, or Firm* — Birch, Stewart, Kolasch & Birch, LLP

(57) ABSTRACT

A method for processing pixels in rasterized image data includes a combination of text and photographic content. Each pixel having a discrete color value, a surround value based on the number of neighboring pixels having the same color value is determined. A division in blocks of two by two pixels is made and a critical number is determined based on the number of surround values lower than a predetermined threshold. This critical number has one of five possible values. Based on this critical number, a discrimination is made between noisy blocks, and flat blocks. The color values of pixels within a noisy block are replaced by an average of the color values of the pixels within the noisy block. For image data rasterized with 600 pixels per inch, this method does not deteriorate the image quality of text nor photographic content. The image data are more apt for lossless compression.

7 Claims, 2 Drawing Sheets

METHOD FOR PROCESSING RASTERIZED IMAGE DATA

BACKGROUND OF THE INVENTION

1. Field of the Invention

The invention relates to a method for filtering pixels in rasterized image data, comprising a combination of text and photographic content, each pixel having a discrete color value. The invention further relates to a method for image compression, a computer program product for executing the invented method and an electronic device, configured to execute the method.

2. Description of the Related Art

Many contemporary print systems employ rasterized image data to print an image in a print process wherein colorants are applied in the form of e.g. toner or ink, on a flat medium, such as paper. These rasterized image data comprise pixels, each pixel having a discrete color value that indicates a color of the image on the position of the pixel. These pixels are often generated by a raster image processor (RIP) that converts image data as specified in the form of objects in a page description language (PDL), such as PDF, PostScript or HP-GL, into rasterized image data using conventional processes like interpretation and rendering. A color management module is involved in the rendering process to convert an input color to an output color in a color space that is specific for the printer that is to produce the printed output. The quality of the rasterized image data depends among others on the resolution, which is the number of pixels per unit length, such as the number of pixels per inch (ppi). Photographic objects and other rasterized objects in a PDL are already rasterized and therefore only need resampling to obtain pixels at the required resolution. In contrast, objects described by the use of vector graphics and geometrical primitives, including characters defined in outline fonts, are rasterized directly in the required resolution. Color values of pixels comprise at least three components for full color images, but may also refer to intensity values, or grey values, in a monochrome image.

In its rasterized form, an image may comprise so much data that data compression is used to reduce the data set for storage and transfer. However, in order to retain the image quality, a lossless image compression technique is applied, which often involves runlength coding for recurring pixel values. E.g. in US patent application 2009/0129691, a lossless image compression technique is described, wherein, in addition to familiar two dimensional runlength coding, dedicated codes are used to encode small differences between neighboring pixels. Still, the compression arrived at by this coding may be insufficient for a sufficiently high data transfer rate in the case of high speed printing. It may also be insufficient for storing a sufficient number of print jobs in an available memory, volatile or non-volatile. Putting it differently, given a predetermined memory size, a larger number of print jobs may be stored in the available memory, if more compression can be achieved. After decoding the losslessly compressed data, the original rasterized image data are obtained.

As indicated above, the rasterized image data comprises text as well as photographic content. These content types show different behaviour under lossless compression. Text is used in this context for content type stemming from all kind of vector graphics, such as lines and other graphical primitives. Text and business graphics compress very well, because the pixel values of these content types show predictable behaviour, whereas photographic content and other rasterized image content can not be compressed as effectively, because each pixel value may differ from its predecessors. For this reason, the part of the image data relating to photographic content may be filtered in a way to improve the compression factor, which is the ratio of the amount of image data before the compression and the amount of image data after the compression. This is disclosed in U.S. Pat. No. 6,373,583, wherein the image data with photographic content are filtered prior to the rasterization of a page with mixed content. However, the kind of filter as used in said patent, is only applicable to photographic content, as the image quality of text content would undergo serious deterioration due to the filtering, leading to unacceptable loss of visual quality of a print. In addition, the application of the filter might lead to a lower compression factor for the text content.

In an image data processing path for preparing image data for a print engine, the rasterization is applied to full pages of a document. In order to apply a filter to photographic content only, the related objects must be marked or retrieved by recognition or segmenting techniques. This would lead to rather complicated processing steps, that would hinder the increase in processing speed that is needed for high speed print engines. Therefore, a problem exists to filter rasterized image data that comprises both text and photographic content.

An object of the present invention is to find a simple method, which is applicable in high speed print engines, for filtering rasterized image data that comprises both text and photographic content in such a way that the lossless compression factor is raised without affecting the image quality.

SUMMARY OF THE INVENTION

According to the present invention, a method for filtering comprising the steps of determining for each pixel as a current pixel a surround value, based on a number of neighboring pixels having the same color value as said current pixel, dividing the pixels in blocks of two by two pixels, determining a first critical number for each block of pixels, based on a number of surround values lower than a predetermined surround threshold within each block of pixels, discriminating noisy blocks, wherein pixels have different color values, from flat blocks, wherein pixels have the same color values, based on said first critical number, and replacing the color values of pixels within a noisy block by an average of the color values of the pixels within the noisy block, has the required qualities. In text and similarly looking content, a pixel may have several neighboring pixels with an equal color value. These pixels therefore obtain a high surround value. In photographic content, a pixel may have a low surround value, since its neighboring pixels often have a different color value. In a block of two by two pixels, the number of pixels with a surround value lower than a predetermined surround threshold determines whether the block of pixels is considered a noisy block or a flat block. It has been found that replacing the color values of pixels in a noisy block by an average value of these color values does not affect the image quality, in contrast to filtering all pixels in the image data. By its simplicity, this filtering method is suitable for application in high speed printing and thus solves a problem of previous methods.

In a preferred embodiment, the predetermined surround threshold is two. A pixel having zero or one neighboring pixel with equal color value contributes in this way to the first critical number for determining whether the block is a noisy block.

In a further embodiment, a second critical number is determined for each block of pixels, based on the number of surround values equal to three within each block of pixels.

This is based on the behaviour of pixels in a rasterized image in a PDL with a lower resolution than the resolution in which the complete image is rasterized. In the rendering process, pixels in the new resolution may be generated in a way that the value of a pixel is copied in a further pixel, with the result that the number of neighboring pixels having an equal color value is three.

In a further embodiment, a block is discriminated as a noisy block if the first critical number is larger than one and a sum of the first and the second critical number is equal to four. Since a block has four pixels, this means that a noisy block has only pixels with a surround value of zero, one, or three and at least two of the four pixels have a surround value of zero or one.

The invented filtering method has proven to be useful if it is followed by a lossless compression method. The compression factor of the combination is improved over the compression method without the filtering method, without making the calculation processes more complex. Independent of the implementation of the compression process on special purpose or general purpose processors, the filtering method may be supplemented in the implementation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Hereinafter, the present invention is further elucidated with references to the appended drawings showing non-limiting embodiments and wherein.

DETAILED DESCRIPTION OF EMBODIMENTS

Figure 1:
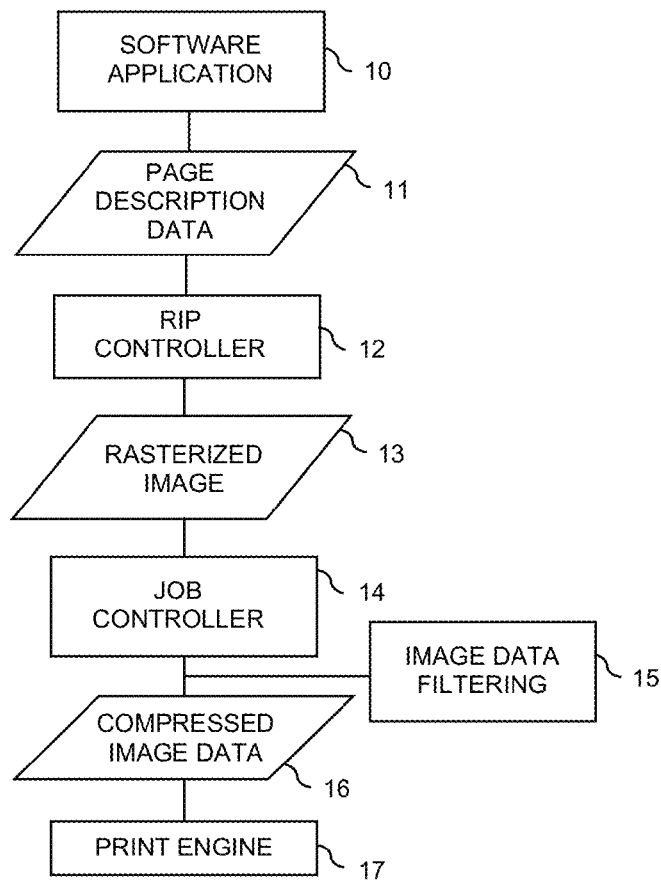
FIG. 1 is an architecture for image data in a print system.

FIG. 1 shows a number of image data processing elements that are applied in a print system. A software application 10 is used to compose a document comprising images to be printed. Herefrom, page description data 11 emerge that define the images. The RIP controller 12 converts the image data into a rasterized form 13, applying color management to specify the color of the pixels in a color space that is used by the specified print engine. A resolution of 600 ppi is used in order to have sufficient quality in the rendering of text and lines, although for photographic content 300 ppi would be sufficient. The rasterized image 13 is transferred to a job controller 14 that is configured to collect and save documents and to control the image data that is sent to a print engine 17 as part of a print job. The image data are kept in a losslessly compressed format 16 in order to save memory space and data transfer time. The print engine 17 comprises an electronic module for decompressing the image data. The invented method for filtering the rasterized image data is inserted in a module 15 that is part of the job controller 14.

Figure 2:
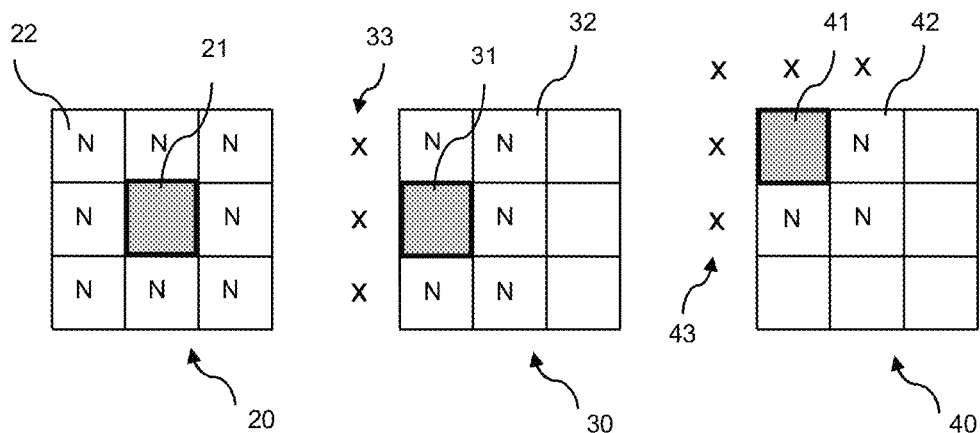
FIG. 2 shows the neighboring pixels of a current pixel.

To elucidate the action of the invented method of the present application, three pixel surroundings of a current pixel are shown in FIG. 2. In pixel surrounding 20, a current pixel 21 is surrounded by eight neighbor pixels 22. The color value of the neighbor pixels is compared with the color value of the current pixel to determine a surround value which indicates the number of neighbor pixels with an equal color value. The color value may comprise one or more components from various channels of a color image. In a conventional color image with a cyan, magenta, yellow and black channel, also known as a CMYK image, each pixel value has four components and a pixel value equals it neighbor if each of the four components is equal to the component of the same channel of the neighbor pixel. The surround value is thus in the range of zero to eight. Pixel surrounding 30 indicates a current pixel 31 on the edge of a rasterized image. This pixel has five neighboring pixels 32 in the image and three missing neighbors 33 on the outside. In order to determine a surround value, the missing neighbors are assumed to have a pixel value corresponding to a specific color, e.g. a white or a black color. The same procedure is followed for a pixel on the corner of the image as is shown in pixel surrounding 40. Current pixel 41 has three neighboring pixels 42 with a pixel value, whereas five missing neighbors 43 have an assumed value for determining a surround value.

Figures 3, 4:
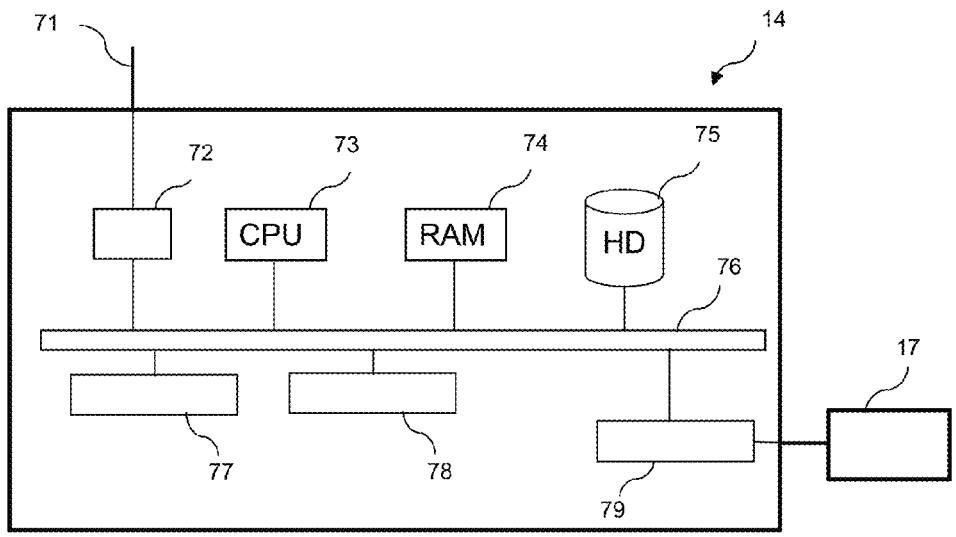
FIG. 3 is an example of a discrimination of noisy and flat blocks.
FIG. 4 is a print system architecture in which the invented method is applied.

FIG. 3 is a part of a rasterized image 50 having pixel values 51 and an associated image 60 in which a surround value for each pixel is shown. In this example, the pixel values have one component, originating from various objects in a PDL. Usually, color values have more than one component and a color value equals a second color value if and only if all of the components of both color values are equal. Blocks of two by two pixels are indicated in the associated image 60. Based on the surround values of the pixels in a block, a discrimination between noisy and flat blocks is made. A noisy block has many different pixel values and hence the surround values in a noisy block are low, at least lower than a predetermined surround threshold. A flat block has many pixels with the same pixel value and therefore has pixels with a high surround value. The values of the pixels in the noisy blocks are averaged to obtain a new value that replaces the current values of the pixels. Averaging of values comprising one or more component means determining for each component separately a sum of the component of the color value of all pixels in a block and dividing the sum by the number of pixels, which is four in this case. The averaged component replaces that component for each pixel in the block, so that after this operation all pixels in a noisy block have the same value.

A discrimination criterion is based on critical numbers that are defined for each block. In a preferred embodiment, a first critical number is the number of surround values smaller than two. In the example, block 61 has four pixels with a surround value smaller than two and the first critical number of this block is four. Block 62 has a first critical number equal to one. Based these numbers block 61 is a noisy block and block 62 is a flat block, using as criterion that the first critical number is larger than two. A second critical number is the number of surround values equal to three. Block 63 has a second critical number of one, whereas block 64 has a second critical number of three. If, in addition to the first critical number being larger than one, the sum of the first critical number and the second critical number equals four, the block may also be considered as a noisy block, for which the associated pixel values may be averaged without negative consequences for the print quality of the image.

FIG. 4 shows a job controller 14, that receives rasterized image data from a RIP controller through the data connection 71 as well as the associated job parameters for printing the print job comprising the image data. The job controller 14 comprises familiar computer components, such as a data bus 76, a data receiver 72, a central processing unit 73, a volatile memory 74, and a non-volatile memory 75. It further comprises a module 77 for executing the invented method for filtering the image data, and an image data compression module 78 for lossless compression. Besides saving the compressed data in the memory of the controller, the compressed image data may be sent to the print engine 17, where the data are decompressed at the time of printing.

The above disclosure is intended as merely exemplary, and not to limit the scope of the invention, which is to be determined by reference to the following claims.

The invention claimed is:

1. A method for filtering pixels in rasterized image data comprising a combination of text and photographic content, each pixel having a discrete color value, the method comprising the steps of:

determining for each pixel as a current pixel a surround value based on a number of neighboring pixels having the same color value as said current pixel;

dividing the pixels in blocks of two by two pixels;

determining a first critical number for each block of pixels, based on a number of surround values lower than a predetermined surround threshold within each block of pixels;

discriminating noisy blocks, wherein pixels have different color values, from flat blocks, wherein pixels have the same color values, based on the first critical number;

replacing the color values of pixels within a noisy block by an average of the color values of the pixels within the noisy block.

2. The method according to claim 1, wherein the predetermined surround threshold is two.

3. The method according to claim 2, comprising the further step of determining a second critical number for each block of pixels, based on the number of surround values equal to three within each block of pixels.

4. The method according to claim 3, wherein block is discriminated as a noisy block if the first critical number is larger than one and a sum of the first and the second critical number is equal to four.

5. A method of image data compression, comprising a lossless compression method preceded by a method according to claim 1.

6. A computer program product, including non-transitory computer readable code embodied on a computer readable medium, said computer program product for executing a method for filtering pixels in rasterized image data comprising a combination of text and photographic content, each pixel having a discrete color value, said method comprising the steps of:

determining for each pixel as a current pixel a surround value based on a number of neighboring pixels having the same color value as said current pixel;

dividing the pixels in blocks of two by two pixels;

determining a first critical number for each block of pixels, based on the number of surround values lower than a predetermined surround threshold within each block of pixels;

discriminating noisy blocks, wherein pixels have different color values, from flat blocks, wherein pixels have the same color values, based on the first critical number;

replacing the color values of pixels within a noisy block by an average of the color values of the pixels within the noisy block.

7. An electronic device for filtering pixels in rasterized image data comprising a combination of text and photographic content, each pixel having a discrete color value, said electronic device being configured to determine for each pixel as a current pixel a surround value based on a number of neighboring pixels having the same color value as said current pixel;

divide the pixels in blocks of two by two pixels;

determine a first critical number for each block of pixels, based on the number of surround values lower than a predetermined surround threshold within each block of pixels;

discriminate noisy blocks, wherein pixels have different color values, from flat blocks, wherein pixels have the same color values, based on the first critical number;

replace the color values of pixels within a noisy block by an average of the color values of the pixels within the noisy block.

* * * * *